(12) United States Patent
Lu et al.

(10) Patent No.: US 9,016,625 B2
(45) Date of Patent: Apr. 28, 2015

(54) RECONFIGURABLE FLOORBOARD SYSTEM

(75) Inventors: Roberto F. Lu, Bellevue, WA (US);
Owen C. Moheet, Mount Pleasant, SC (US); Rachel L. Hannah, Charleston, SC (US)

(73) Assignee: The Boeing Company, Chicago, IL (US)

( * ) Notice: Subject to any disclaimer, the term of this patent is extended or adjusted under 35 U.S.C. 154(b) by 605 days.

(21) Appl. No.: 13/105,432

(22) Filed: May 11, 2011

(65) Prior Publication Data

US 2012/0286092 A1  Nov. 15, 2012

(51) Int. Cl.
*B64C 1/18* (2006.01)
*B64F 5/00* (2006.01)

(52) U.S. Cl.
CPC .................. *B64C 1/18* (2013.01); *B64F 5/0009* (2013.01)

(58) Field of Classification Search
USPC ............ 244/119, 118.5, 117 R, 118.1, 118.2; 52/588.1
See application file for complete search history.

(56) References Cited

U.S. PATENT DOCUMENTS

| | | | |
|---|---|---|---|
| 3,696,578 A * | 10/1972 | Swensen et al. | 52/789.1 |
| 4,000,870 A * | 1/1977 | Davies | 410/92 |
| 4,574,555 A * | 3/1986 | Cline | 52/783.1 |
| 4,676,036 A * | 6/1987 | Bessert | 52/126.6 |
| 6,554,225 B1 | 4/2003 | Anast et al. | |
| 7,191,982 B2 | 3/2007 | Vetillard et al. | |
| 7,338,013 B2 | 3/2008 | Vetillard et al. | |
| 8,210,477 B2 * | 7/2012 | Stabenau | 244/131 |
| 2006/0231681 A1 * | 10/2006 | Huber et al. | 244/119 |
| 2007/0176048 A1 * | 8/2007 | Huber et al. | 244/119 |
| 2008/0210820 A1 * | 9/2008 | Kismarton et al. | 244/120 |
| 2009/0126294 A1 * | 5/2009 | Lovald et al. | 52/220.2 |
| 2009/0166472 A1 | 7/2009 | Kook et al. | |
| 2010/0043334 A1 * | 2/2010 | Rodriguez Alcaine | 52/588.1 |
| 2010/0065681 A1 | 3/2010 | Gonnsen et al. | |
| 2010/0140408 A1 * | 6/2010 | Stabenau | 244/131 |
| 2010/0281810 A1 * | 11/2010 | Ruland | 52/588.1 |
| 2011/0120037 A1 * | 5/2011 | Barlow | 52/309.1 |
| 2011/0179728 A1 * | 7/2011 | Cerny et al. | 52/177 |
| 2011/0252730 A1 * | 10/2011 | Rosan | 52/302.1 |

* cited by examiner

*Primary Examiner* — Tien Dinh
*Assistant Examiner* — Steven Hawk
(74) *Attorney, Agent, or Firm* — Charles L. Moore; Moore & Van Allen PLLC (57) ABSTRACT

A floorboard for a reconfigurable floorboard system may include a substantially trapezoid shaped plate. An interlocking feature may be formed proximate an edge of at least three sides of the plate for interlocking with adjacent floorboards. Each interlocking feature may be formed to interlock with a mating interlocking feature formed at an edge of a side of at least one adjacent floorboard. A notch may be formed on an underside of the plate proximate each corner of the plate to contact a member of a floor grid to prevent movement of the floorboard.

27 Claims, 8 Drawing Sheets

RECONFIGURABLE FLOORBOARD SYSTEM

FIELD

The present disclosure relates to aircraft, aerospace vehicles, other vehicles and other structures, and more particularly to dynamic optimized reconfigurable floorboard system for aircraft, other vehicles or other structures.

BACKGROUND

During the fabrication of a vehicle, such as an aircraft or other aerospace vehicle, a floor including a plurality of floorboards may be installed to facility construction of the vehicle or aircraft. Mechanics have to maneuver over a passenger floor grid in the case of a passenger airliner to load the floorboards into the floor grid. The floorboards are then taped together to prevent movement and to prevent foreign object debris (FOD) from falling through any spaces between the floorboards. Taping the boards together requires a significant amount of labor and time. Maintenance is also required to make sure the boards continue to form a barrier to FOD. Additionally, boards often have to be removed to install components of the aircraft, such as galley support hose components and other equipment. This requires removal of the tape from the effected boards and re-taping when the board is reinstalled. The boards may also sit on top of fillers at some locations which may cause the boards to be unstable. The boards can also be cumbersome and difficult to handle requiring multiple mechanics for proper placement and installation. There is need for a reconfigurable floorboard system that can be easily and efficiently installed, protects from FOD and permits floorboards to be easily and efficiently removed and replaced.

SUMMARY

In accordance with an embodiment, a floorboard for a reconfigurable floorboard system may include a substantially trapezoid shaped plate. An interlocking feature may be formed proximate an edge of at least three sides of the plate for interlocking with adjacent floorboards. Each interlocking feature may be formed to interlock with a mating interlocking feature formed at an edge of a side of at least one adjacent floorboard. A notch may be formed on an underside of the plate proximate each corner of the plate to contact a member of a floor grid to prevent movement of the floorboard and to provide stability of the floorboard when it bears weight.

In accordance with an embodiment, a reconfigurable floorboard system may include a floor grid structure. A plurality of floorboards may be disposed on the floor grid structure. Each floorboard may include a substantially trapezoid shaped plate. An interlocking feature may be formed proximate to an edge of at least three sides of the plate for interlocking with adjacent floorboards. Each interlocking feature may be formed to interlock with a mating interlocking feature formed at an edge of a side of at least one adjacent floorboard. A notch may be formed on an underside of the plate proximate each corner of the plate to contact a member of the floor grid structure to prevent lateral movement of the floorboard and to provide stability of the floorboard when it bears weight.

In accordance with another embodiment, a method for installing a reconfigurable floorboard system may include interlocking each of a plurality of floorboards on a floor grid. Interlocking each floorboard may include receiving by an interlocking feature formed at an edge of a side of the floorboard, a mating interlocking feature formed at an edge of a side of at least one adjacent floorboard. The method may also include abutting a notch formed on an underside of the floorboard proximate each corner of the floorboard to a member of the floor grid to prevent lateral movement of the floorboard.

Other aspects and features of the present disclosure, as defined solely by the claims, will become apparent to those ordinarily skilled in the art upon review of the following non-limited detailed description of the disclosure in conjunction with the accompanying figures.

BRIEF DESCRIPTION OF THE SEVERAL VIEWS OF THE DRAWINGS

The following detailed description of embodiments refers to the accompanying drawings, which illustrate specific embodiments of the disclosure. Other embodiments having different structures and operations do not depart from the scope of the present disclosure.

DESCRIPTION

The following detailed description of embodiments refers to the accompanying drawings, which illustrate specific embodiments of the disclosure. Other embodiments having different structures and operations do not depart from the scope of the present disclosure. Like reference numerals may refer to the same element or component in the different drawings.

Figure 1A:
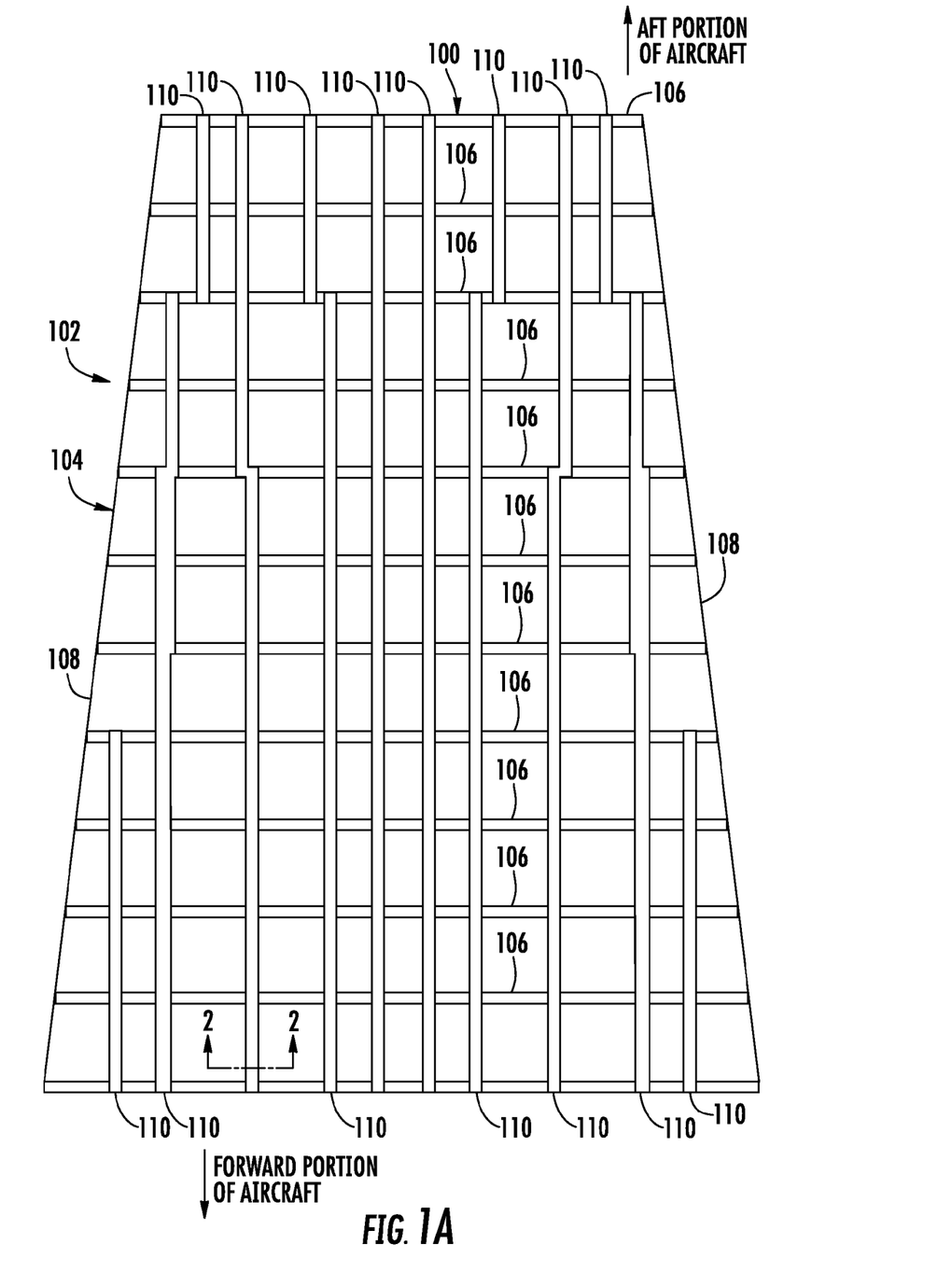
FIG. 1A is a top view of an example of a floor grid for a reconfigurable floorboard system in accordance with an embodiment of the present disclosure.

FIG. 1A is a top view of an example of a floor grid structure 100 for a reconfigurable floorboard system 102 in accordance with an embodiment of the present disclosure. The reconfigurable floorboard system 102 will be described herein with regard to use in an aircraft 104, although the floorboard system 102 described herein may be adapted for use in any vehicle or other structure. The floor grid structure or floor grid 100 may be formed or constructed on an interior of a vehicle or other structure. The floor grid 100 may include a plurality of floor beams 106. The floor beams 106 may extend laterally across the aircraft 104 between opposite sides of a fuselage 108 of the aircraft 104. The floor grid 100 may also include a plurality of floor tracks 110. The floor tracks 110 may extend substantially orthogonally to the floor beams 106. The floor tracks 110 may be attached to the floor beams 106 by suitable fasteners or by another mechanism.

Figure 2:
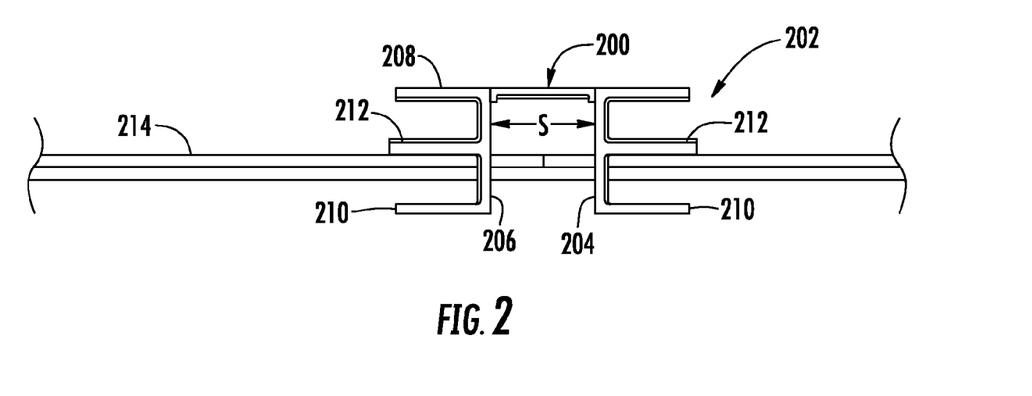
FIG. 2 is a detailed cross-section of an example of a floor track of a floor grid in accordance with an embodiment of the present disclosure.

Referring also to FIG. 2, FIG. 2 is a detailed cross-section of an example of a floor track 200 of a floor grid structure 202 in accordance with an embodiment of the present disclosure. The floor grid 202 and floor track 200 may be the same as the floor grid 100 and floor track 110 of FIG. 1 with the cross-section taken along lines 2-2. The floor track 200 may be substantially pi (π) shaped including a pair of vertical members 204 and 206 at a predetermined spacing "S" from one another and a top member 208 joining the two vertical members 204 and 206. A lower flange 210 may extend perpendicular from a lower end of each vertical member 204 and 206. An intermediate flange 212 may extend perpendicular from each vertical member 204 and 206 at an intermediate location between the top member 208 and each lower flange 210. The intermediate flanges 212 may be disposed on a floor beam 214 of the floor grid 202. The floor track 200 may be attached to the floor beam 214 by fastening the intermediate flanges 212 to the floor beam 214.

Figure 1B:
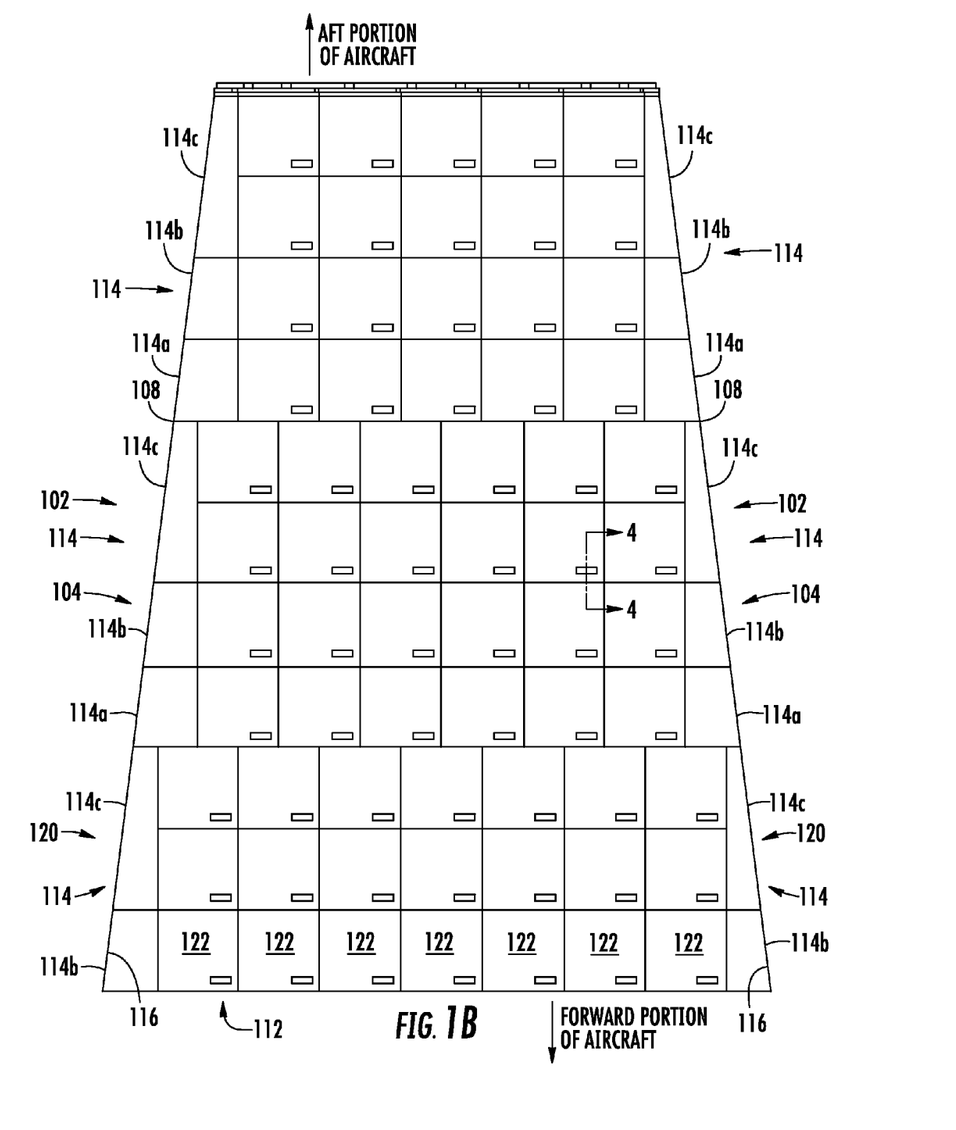
FIG. 1B is a top view of an example of the reconfigurable floorboard system with the floorboards installed on the floor grid in accordance with an embodiment of the present disclosure.

Referring now to FIG. 1B, FIG. 1B is a top view of an example of the reconfigurable floorboard system 102 with a plurality of floorboards 112 installed on the floor grid structure 100 (FIG. 1A) in accordance with an embodiment of the present disclosure. As described in more detail herein, each of the floorboards may include a substantially trapezoid shaped plate as illustrated in FIG. 1B. In accordance with an embodiment, particularly for an aircraft 104, the plurality of floorboards 112 may include a plurality of sets of tapered floorboards 114. Each tapered floorboard 114 may have a predetermined tapered form for insertion in the floorboard system 102 of the aircraft 104 next to a tapered interior portion 116 of the fuselage 108 of the aircraft 104. The tapered interior portion 116 of the fuselage 108 may also have a selected curvature. An outboard side of each tapered floorboard 114 may then have a chosen curvature to substantially match the selected curvature of the interior portion 116 of the fuselage 108. Accordingly, the outboard side of each tapered floorboard 114 may be formed to substantially match or correspond to the interior portion 116 of the fuselage so that the outboard side of each tapered floorboard 114 may abut or contact the interior 116 of the fuselage 108 to prevent FOD from getting to an area underneath the floorboards 112 and to provide stability of the floorboards 112.

In accordance with an embodiment, each complete set of tapered floorboards 114 may include three different types of tapered floorboards 114a, 114b and 114c. The different types of tapered floorboards 114a, 114b and 114c may respectively each be substantially identical and may have the same dimensions and other structural features in each set of floorboards 114 so that the respective types of floorboards 114a-114c may be interchangeable with the same type floorboard 114a-114c and the floorboards may be dynamically reconfigured, for example, in different aircraft. Along some portions of the fuselage 108 only one or two tapered floorboards 104 may be used. For example, a forward section 120 of the fuselage 108 in the example of FIG. 1B only uses tapered floorboard types 114b and 114c.

The plurality of floorboards 112 may also include a set of substantially square shaped floorboards 122. In another embodiment, the floorboards 122 may be another shape, such as rectangular. The set of substantially square shaped floorboards 122 may be for insertion in the floorboard system 102 between the sets of tapered floorboards 114 which are installed next to opposite sides of the fuselage 108.

Figure 3A:
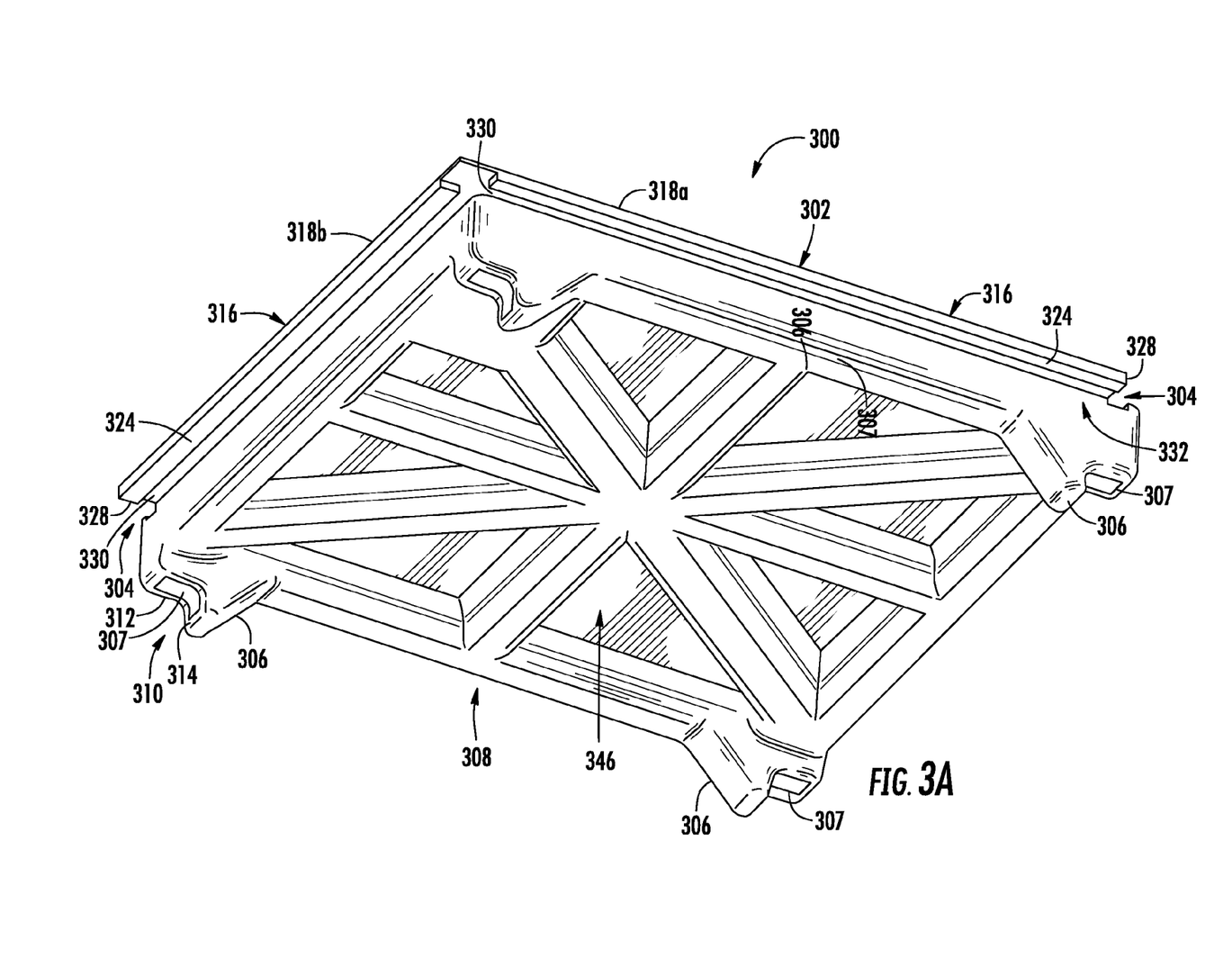
FIG. 3A is a bottom detailed perspective view of a floorboard for use in a reconfigurable floorboard system in accordance with an embodiment of the present disclosure.
Figure 3B:
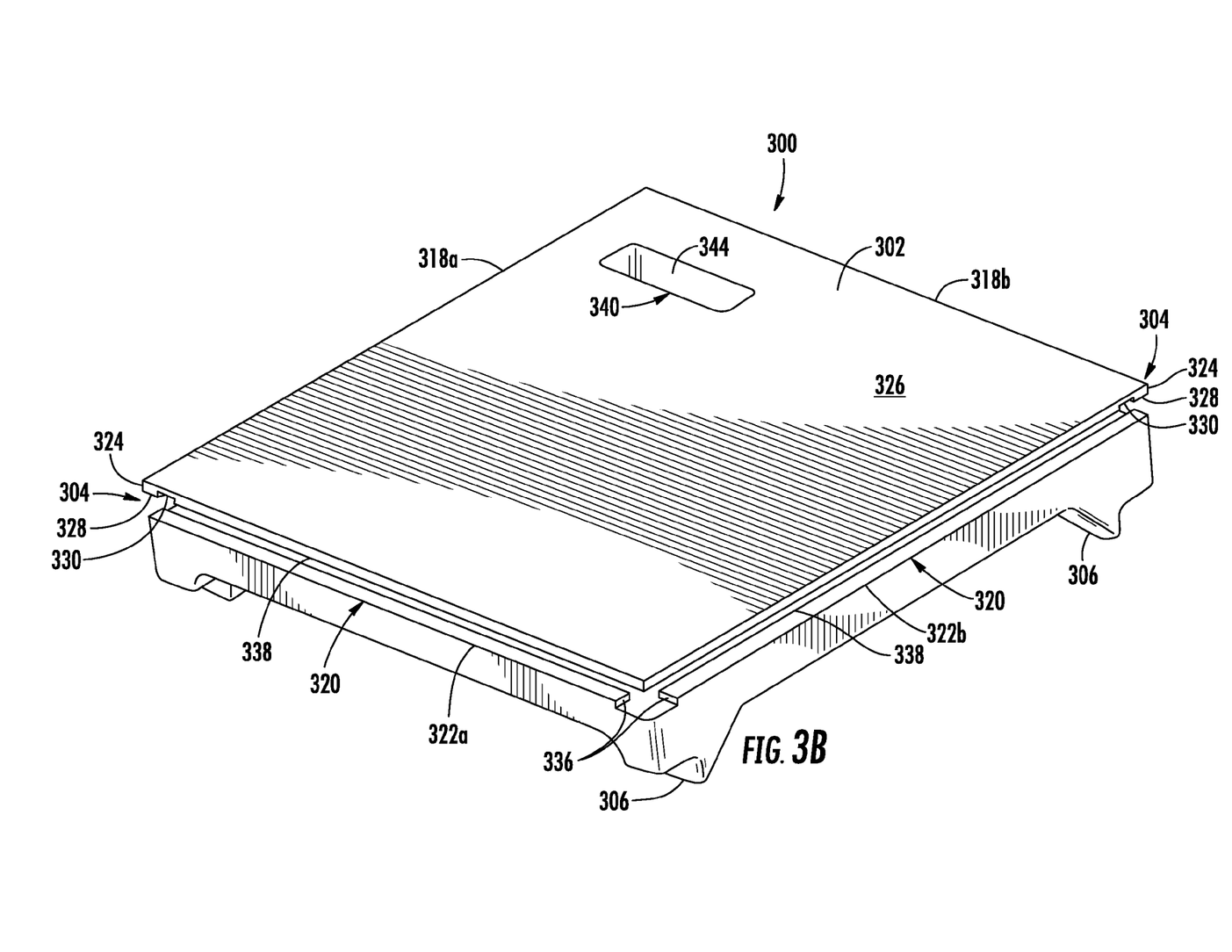
FIG. 3B is a top detailed perspective view of the exemplary floorboard of FIG. 3A in accordance with an embodiment of the present disclosure.

Referring now to FIGS. 3A and 3B, FIG. 3A is a bottom detailed perspective view of an example of a floorboard 300 for use in a reconfigurable floorboard system, such as the floorboard system 102 in FIG. 1B in accordance with an embodiment of the present disclosure. FIG. 3B is a top detailed perspective view of the exemplary floorboard 300 of FIG. 3A in accordance with an embodiment of the present disclosure. The floorboard 300 may be used for floorboards 122 in FIG. 2B. The tapered floorboards 122 in FIG. 2B would also include similar features to those of floorboard 300 but may not have an interlocking feature formed on each side of the floorboard. For example, the side of the tapered floorboard 114a-114c that contacts the fuselage 108 may not include an interlocking feature.

The floorboard 300 may include a substantially trapezoid shaped plate 302. As previously described, the floorboard 300 or plate 302 may be tapered to substantially correspond to an interior portion of a vehicle or fuselage of an aircraft. The floorboard 300 or plate 302 may also be substantially square or rectangular for insertion into a reconfigurable floor system, such as system 102 in FIG. 1B.

The floorboard 300 may also include an interlocking feature 304 formed proximate an edge of at least three sides of the plate 302 for interlocking with adjacent floorboards. Each interlocking feature 304 may be formed to interlock with a mating interlocking feature 304 formed at an edge of a side of at least one adjacent floorboard.

Figure 4:
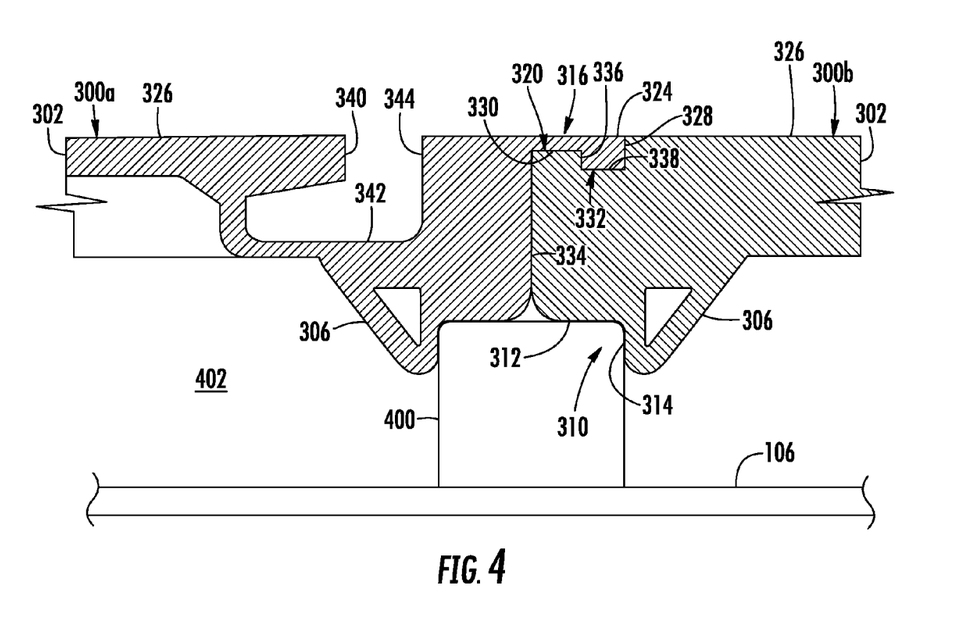
FIG. 4 is a side cross-sectional view of a portion of the floorboard system of FIG. 1B taken along lines 4-4.

The floorboard 300 may also include a notch 306 formed on an underside 308 (FIG. 3A) of the plate 302 proximate each corner of the plate 302. As best illustrated in FIG. 4, the notch 306 is adapted to contact a member 400 of a floor grid, such as floor grid 100 in FIG. 1 to prevent lateral movement of the floorboard 300 or 114 or 122 in FIG. 1B. The notch 306 is also located proximate each corner of the plate 302 or floorboard 300 to provide stability when the floorboard bears weight to prevent any tipping or movement of the floorboard 300. FIG. 4 is a side cross-sectional view of a portion of the floorboard system 102 of FIG. 1B taken along lines 4-4. The member 400 of the floor grid may be the floor track 110 in FIG. 1A disposed on the floor beam 106.

The notch 306 may include a right-angled portion 310 formed by a horizontal surface 312 for contacting a top portion of the floor grid member 400 and a vertical surface 314 for contacting a side of the floor grid member 400 to prevent lateral movement of the floorboard 300. A pad 307 (FIG. 3A) may also be disposed in the right-angled portion 310 of the notch 306 to further provide stability of the floorboard.

The interlocking feature 304 may include a first interlocking feature 316 on each of two adjacent sides 318a and 318b of the floorboard 300 as best shown in FIG. 3A, and a second interlocking feature 320 on each of two other adjacent sides 322a and 322b of the floorboard 300 as best shown in FIG. 3B. Each of the first interlocking features 316 is adapted to matingly interlock with the second interlocking feature 320 and vice versa on respective adjacent floorboards.

Each first interlocking feature 316 may include a lip 324 integrally extending laterally from an upper surface 326 of the plate 302 substantially completely along each side 318a and 318b of the plate 302 (FIG. 3A). Referring also to FIG. 4, each first interlocking feature 316 may also include a projection 328 extending downward from the lip 324 at an edge of the lip 324. Each first interlocking feature 316 may also include a groove 330 formed in an underside 332 of the lip 324 by the projection 328 and a side edge 334 of the plate 302 or floorboard 300a as best shown in FIG. 4.

Each second interlocking feature 320 may include a projection 336 extending upwardly from the edge of an adjacent floorboard 300b (FIG. 4). Each second interlocking feature 320 may also include a groove 338 formed in an upper surface 326 of the floorboard 300b or plate 302. One side of groove 338 may be formed by the projection 336 of the second interlocking feature 320. The groove 338 of the second interlocking feature 320 is adapted to matingly receive the projection 328 of the first interlocking feature 316 of the adjacent floorboard 300a and the groove 330 of the first interlocking feature 316 is adapted to matingly receive the projection 336 of the second interlocking feature 320 of the other adjacent floorboard 330b to interlock the adjacent floorboards 300a and 300b. Because the first interlocking feature 316 and the second interlocking feature 320 each matingly receive the other as just described, either of the interlocking features 316 and 320 may be referred to herein as a mating interlocking feature or similar terminology. As illustrated in FIG. 4, the first and second interlocking features 316 and 320 overlap one another and provide a seal when interlocked to prevent any FOD from falling in an area 402 beneath the floorboards 300a and 300b. The overlapping structure of the interlocking features 316 and 320 provides stability and eliminates the laborious need to tape the joints between the floorboards.

Each floorboard 300 may also include a handle 340 integrally formed in the floorboard 300. The handle 340 may include an enclosed interior 342 except for an opening 344 in the upper surface 326 of the floorboard 300 for insertion of a user's fingers to grip the floorboard 300. The interior 342 of the handle 340 is enclosed and not open to the area 402 underneath the floorboard 300 to prevent any FOD falling into the area 402 underneath the floorboards 300a and 300b. Each floorboard 300 may also include non-slip strips or a similar feature on the upper surface 326 of the floorboard 300 to improve footing and minimize slippage by personnel.

Each floorboard 300 may also include a predetermined reinforcing structure 346 (FIG. 3A). The reinforcing structure 346 may be integrally formed on an underside 308 of the floorboard 300. The floorboard 300 may be made from a suitable plastic, polyvinylchloride (PVC), injection moldable plastic or other material that may be lightweight yet have sufficient strength to withstand any expected loads during use or construction of the vehicle or structure.

Figure 5A:
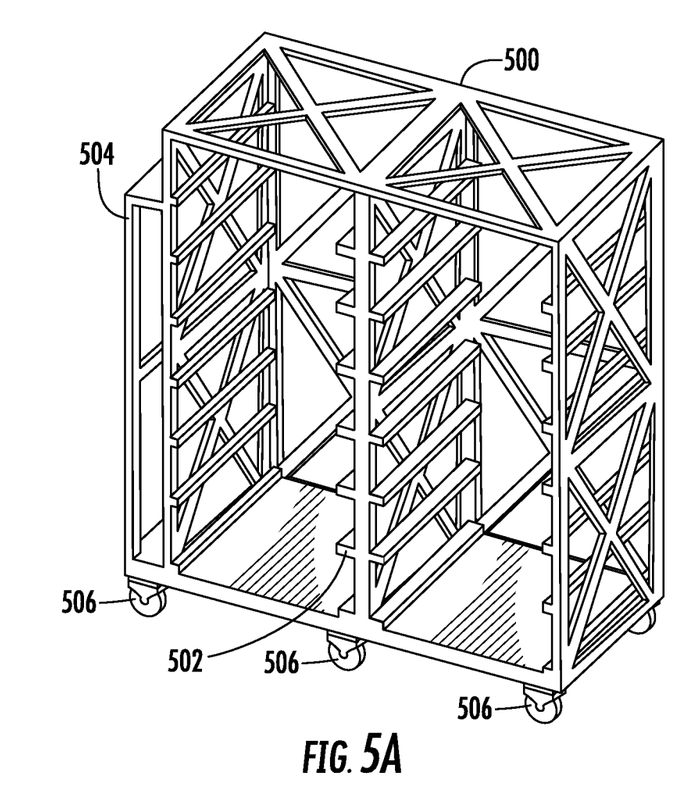
FIGS. 5A and 5B are an example of a moveable cart for storing the floorboards and moving the floorboards from one location to another in accordance with an embodiment of the present disclosure without any floorboards.
Figure 5B:
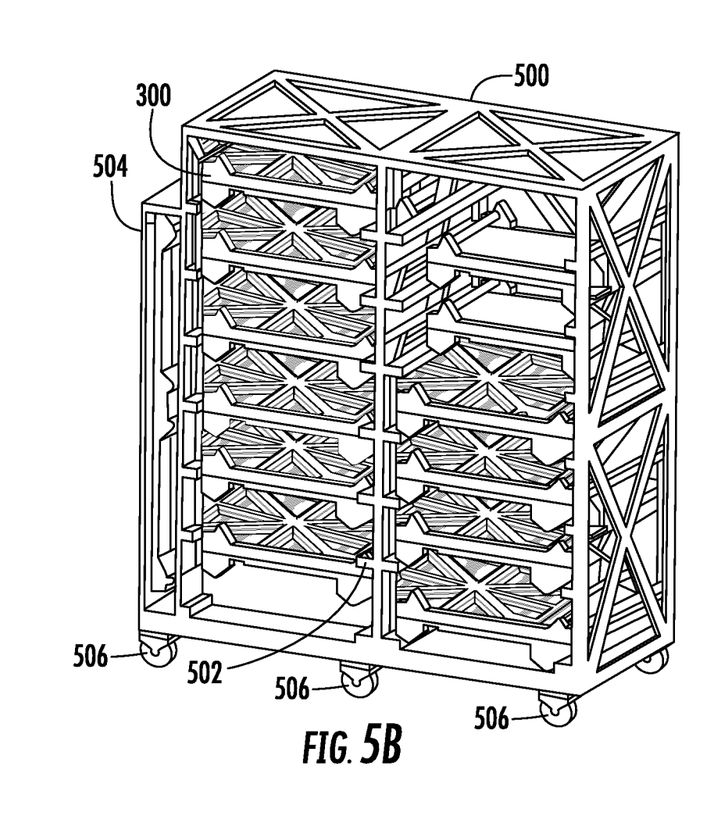

FIGS. 5A and 5B are an example of a moveable cart 500 for storing multiple floorboards 300 and efficiently moving the floorboards 300 from one location to another in accordance with an embodiment of the present disclosure. FIG. 5A is an illustration of the cart 500 unloaded or without any floorboards and FIG. 5B is an illustration of the cart 500 at least partially filled with floorboards 300. The cart 500 may include a plurality of vertically spaced ledges 502 or racks adapted to receive the horizontal surface 312 of the notch 306 (FIG. 4). Each of the ledges 502 or racks are at a predetermined spacing from one another to accommodate a second floorboard 300 being stacked on the first floorboard 300 on each ledge 502 with the second floorboard 300 being placed upside down on the first floorboard 300 or with the upper surfaces 326 (FIG. 4) of the two floorboards 300 facing each other in the cart 500.

The cart 500 may also include a side rack 504 for storing tapered floorboards, such as tapered floorboards 114 similar to that illustrated in FIG. 1B or floorboards with other shapes which may not conveniently fit in the racks or ledges 502. Caster wheels 506 or similar wheels may also be mounted to the cart 500 for rolling the cart 500 between locations and for rolling the cart 500 within an aircraft or structure under construction to facilitate placement of the floorboards 500, reconfiguration or removal of the floorboards 300.

Figure 6:
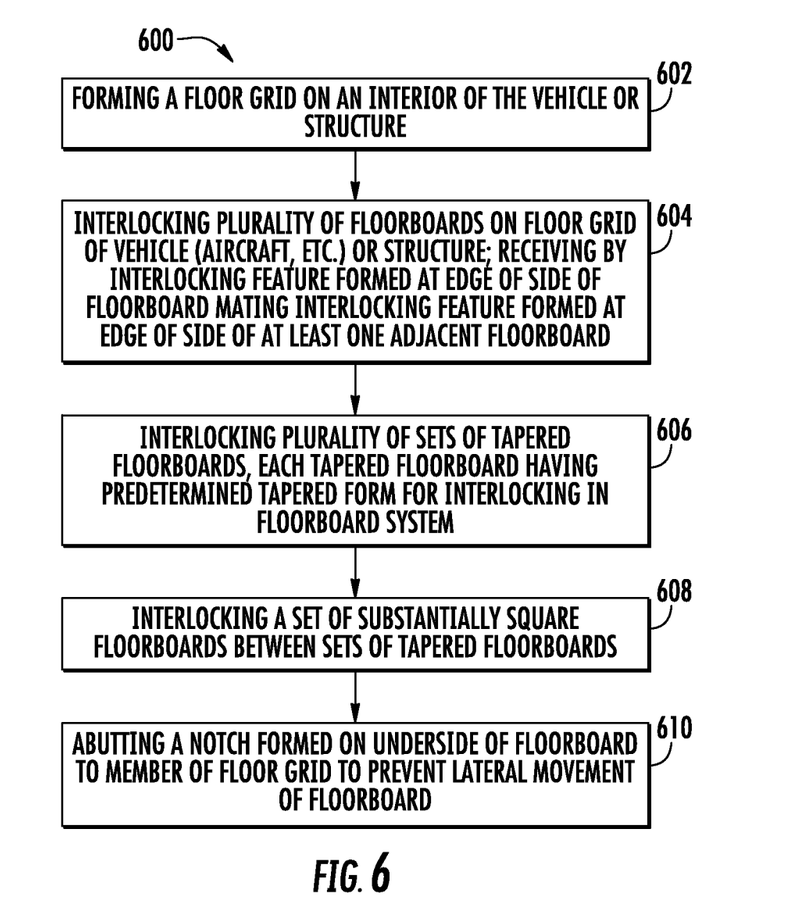
FIG. 6 is a flow chart of an example of a method for installing a reconfigurable floorboard system in accordance with an embodiment of the present disclosure.

FIG. 6 is a flow chart of an example of a method 600 for installing a reconfigurable floorboard system in accordance with an embodiment of the present disclosure. The reconfigurable floorboard system may be the same as the system 102 in FIGS. 1A and 1B. In block 602, a floor grid may be formed or constructed on an interior of a vehicle or structure.

In block 604, a plurality of floorboards may be interlocked on the floor grid. Each floorboard may be interlocked by receiving by an interlocking feature formed at an edge of a side of the floorboard, a mating interlocking feature formed at an edge of a side of at least one adjacent floorboard. In an embodiment, each floorboard may be interlocked by receiving a projection of at least one adjacent floorboard in a groove of the floorboard. The groove may extend substantially completely along the side of the floorboard at the edge of the floorboard similar to that described herein.

In block 606, a plurality of sets of tapered floorboards may be interlocked in the floorboard system, such as for example a floorboard system for an aircraft or similar structure. Each tapered floorboard may include a predetermined tapered form for interlocking in the floorboard system next to a tapered interior portion of a fuselage of the aircraft or other structure.

In block 608, a set of substantially square shaped floorboards may be interlocked in the floorboard system between the sets of tapered floorboards. In block 610, a notch formed on an underside of the floorboard proximate each corner of the floorboard may abut or contact a member of the floor grid to prevent lateral movement of the floorboard in the floorboard system and to provide stability for bearing weight.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the embodiments herein have other applications in other environments. This application is intended to cover any adaptations or variations of the present disclosure. The following claims are in no way intended to limit the scope of the disclosure to the specific embodiments described herein.

What is claimed is:

1. A floorboard for a reconfigurable floorboard system, comprising:
a plate comprising a plurality of sides;
an interlocking feature formed proximate an edge of at least three sides of the plate for interlocking with adjacent floorboards, each interlocking feature being formed to interlock with a mating interlocking feature formed at an edge of a side of at least one adjacent floorboard; and
a notch formed on an underside of the plate proximate each corner of the plate to contact a member of a floor grid to prevent movement of the floorboard, the notch comprising a single horizontal surface and a vertical surface, wherein the horizontal surface is flat without interruption over an extent of the notch from the vertical surface to an end of the horizontal surface opposite the vertical surface, the horizontal surface being chamfered at the end opposite the vertical surface toward a side edge of the plate, the vertical surface contacting a side of the member of the floor grid to prevent lateral movement of the floorboard and the horizontal surface contacting an upper surface of the member of the floor grid when placed on the floor grid.

2. The floorboard of claim 1, wherein the interlocking feature comprises a groove extending substantially completely along the side of the plate proximate to the edge of the plate to matingly receive a projection of the mating interlocking feature formed at the edge of the adjacent floorboard.

3. The floorboard of claim 1, wherein the interlocking feature comprises a lip extending from an upper surface of the plate, the lip comprising:
   a projection extending downward from the lip at an edge of the lip; and
   a groove formed in an underside of the lip by the projection and a side edge of the plate, the groove being adapted to matingly receive a projection extending upwardly from an edge of the adjacent floorboard and the projection extending downwardly from the lip being adapted to be matingly received by a groove formed in an upper surface of the adjacent floorboard.

4. The floorboard of claim 1, wherein the interlocking feature comprises:
   a projection extending upwardly from the edge of the floorboard;
   a groove formed in an upper surface of the floorboard adjacent the projection to matingly receive a projection extending downward from a edge of a lip extending from an upper surface of the adjacent floorboard, the projection extending upwardly from the floorboard being adapted to be matingly received in a groove formed in an underside of the lip by the projection extending downward from the lip of the adjacent floorboard and a side edge of the adjacent floorboard.

5. The floorboard of claim 1, wherein the plate is substantially square shaped and wherein the interlocking feature comprises a first interlocking feature on each of two adjacent sides of the floorboard and a second interlocking feature on each of two other adjacent sides of the floorboard, wherein each of the first interlocking features is adapted to matingly interlock with the second interlocking feature on a respective adjacent floorboard.

6. The floorboard of claim 5, wherein the first interlocking feature comprises:
   a lip integrally extending laterally from an upper surface of the plate substantially completely along the side of the plate;
   a projection extending downward from the lip at an edge of the lip; and
   a groove formed in an underside of the lip by the projection and a side edge of the plate;
   wherein the second interlocking feature comprises:
   a projection extending upwardly from the edge of the floorboard; and
   a groove formed in the upper surface of the floorboard, one side of groove being formed by the projection of the second interlocking feature, the groove of the second interlocking feature being adapted to matingly receive a projection of a first interlocking feature of the adjacent floorboard and the groove of the first interlocking feature being adapted to matingly receive a projection of a second interlocking feature of another adjacent floorboard to interlock the floorboards.

7. The floorboard of claim 1, further comprising a handle integrally formed in the floorboard, wherein the handle comprises an enclosed interior except for an opening in an upper surface of the floorboard for insertion of a user's fingers and a portion of the upper surface of the floorboard extending partially over the enclosed interior of the handle for gripping the floorboard.

8. The floorboard of claim 1, wherein the floorboard comprises a predetermined tapered form shaped for insertion in the floorboard system of an aircraft next to a tapered interior portion of a fuselage of the aircraft.

9. A reconfigurable floorboard system, comprising:
   a floor grid structure;
   a plurality of floorboards disposed on the grid structure, each floorboard comprising:
   a plate comprising a plurality of sides;
   an interlocking feature formed proximate an edge of at least three sides of the plate for interlocking with adjacent floorboards, each interlocking feature being formed to interlock with a mating interlocking feature formed at an edge of a side of at least one adjacent floorboard; and
   a notch formed on an underside of the plate proximate each corner of the plate to contact a member of the floor grid structure to prevent lateral movement of the floorboard, the notch comprising a single horizontal surface and a vertical surface, wherein the horizontal surface is flat without interruption over an extent of the notch from the vertical surface to an end of the horizontal surface opposite the vertical surface, the horizontal surface being chamfered at the end opposite the vertical surface toward a side edge of the plate, the vertical surface contacting a side of the member of the floor grid structure to prevent lateral movement of the floorboard and the horizontal surface contacting an upper surface of the member of the floor grid structure when placed on the floor grid structure.

10. The floorboard system of claim 9, wherein the interlocking feature comprises a groove extending substantially completely along the side of the plate proximate to the edge of the plate to matingly receive a projection of the mating interlocking feature formed at the edge of the adjacent floorboard.

11. The floorboard system of claim 9, wherein the interlocking feature comprises a first interlocking feature on each of two adjacent sides of the floorboard and a second interlocking feature on each of two other adjacent sides of the floorboard, wherein each of the first interlocking features is adapted to matingly interlock with the second interlocking feature on a respective adjacent floorboard.

12. The floorboard system of claim 11, wherein the first interlocking feature comprises:
   a lip integrally extending laterally from an upper surface of the plate substantially completely along the side of the plate;
   a projection extending downward from the lip at an edge of the lip; and
   a groove formed in an underside of the lip by the projection and a side edge of the plate;
   wherein the second interlocking feature comprises:
   a projection extending upwardly from the edge of the floorboard; and
   a groove formed in the upper surface of the floorboard, one side of groove being formed by the projection of the second interlocking feature, the groove of the second interlocking feature being adapted to matingly receive a projection of a first interlocking feature of the adjacent floorboard and the groove of the first interlocking feature being adapted to matingly receive a projection of a second interlocking feature of another adjacent floorboard to interlock the floorboards.

13. The floorboard system of claim 9, wherein the plurality of floorboards comprises:
   a plurality of sets of tapered floorboards, each tapered floorboard having a predetermined tapered form for insertion in the floorboard system of an aircraft next to a tapered interior portion of a fuselage of the aircraft; and
   a set of substantially square shaped floorboards for insertion in the floorboard system between the sets of tapered floorboards next to opposite interior sides of the fuselage.

14. The floorboard system of claim 9, further comprising a handle integrally formed in the floorboard, wherein the handle comprises an enclosed interior except for an opening in an upper surface of the floorboard for insertion of a user's fingers and a portion of the upper surface of the floorboard extending partially over the enclosed interior of the handle for gripping the floorboard, wherein the handle permits reconfiguration of the floorboard system and removal of a selected floorboard for access to an area underneath the floorboard.

15. The floorboard system of claim 9, wherein the plurality of floorboards are adapted to be stored on a moveable cart, wherein the movable cart is moved on previously placed floorboards when installing the reconfigurable floorboard system.

16. A method for installing a reconfigurable floorboard system, comprising:
   interlocking each of a plurality of floorboards on a floor grid, wherein interlocking each floorboard comprises receiving by an interlocking feature formed at an edge of a side of the floorboard, a mating interlocking feature formed at an edge of a side of at least one adjacent floorboard; and
   abutting a notch formed on an underside of the floorboard proximate each corner of the floorboard to a member of the floor grid to prevent lateral movement of the floorboard, the notch comprising a single horizontal surface and a vertical surface, wherein the horizontal surface is flat without interruption over an extent of the notch from the vertical surface to an end of the horizontal surface opposite the vertical surface, the horizontal surface being chamfered at the end opposite the vertical surface toward a side edge of the plate, the vertical surface contacting a side of the member of the floor grid to prevent lateral movement of the floorboard and the horizontal surface contacting an upper surface of the member of the floor grid when placed on the floor grid.

17. The method of claim 16, wherein interlocking each floorboard comprises receiving a projection of the at least one adjacent floorboard in a groove of the floorboard, the groove extending substantially completely along the side of the floorboard at the edge of the floorboard.

18. The method of claim 16, wherein the floorboard is substantially square shaped and wherein the interlocking feature comprises a first interlocking feature on each of two adjacent sides of the floorboard and a second interlocking feature on each of two other adjacent sides of the floorboard, interlocking each floorboard comprises matingly interlocking each of the first interlocking features with the second interlocking feature on the at least one adjacent floorboard.

19. The method of claim 18, wherein the first interlocking feature comprises:
   a lip integrally extending laterally from an upper surface of the floorboard substantially completely along the side of the floorboard;
   a projection extending downward from the lip at an edge of the lip; and
   a groove formed in an underside of the lip by the projection and a side edge of the floorboard;
   wherein the second interlocking feature comprises:
   a projection extending upwardly from the edge of the floorboard; and
   a groove formed in the upper surface of the floorboard, one side of groove being formed by the projection of the second interlocking feature,
   wherein interlocking the plurality of floorboards comprises:
   matingly receiving by the groove of the second interlocking feature a projection of a first interlocking feature of the at least one adjacent floorboard; and
   matingly receiving by the groove of the first interlocking feature a projection of a second interlocking feature of another adjacent floorboard to interlock the floorboards.

20. The method of claim 16, wherein the reconfigurable floorboard system is installed in an aircraft and wherein interlocking the plurality of floorboards comprises:
   interlocking a plurality of sets of tapered floorboards, each tapered floorboard having a predetermined tapered form for interlocking in the floorboard system of the aircraft next to a tapered interior portion of a fuselage of the aircraft; and
   interlocking a set of substantially square shaped floorboards for interlocking in the floorboard system between the sets of tapered floorboards next to opposite interior sides of the fuselage.

21. The floorboard of claim 1, further comprising a pad disposed in the right-angled portion of the notch that provides further stability of the floorboard.

22. The method of claim 16, further comprising storing the floorboards on a movable cart when not installed in the reconfigurable floorboard system.

23. The method of claim 22, further comprising rolling the movable cart on previously placed floorboards to facilitate installing the reconfigurable floorboard system.

24. The method of claim 22, wherein the movable cart comprises a plurality of vertically spaced ledges or racks that receive a respective floorboard.

25. The method of claim 22, wherein the cart comprises a side rack that stores a tapered floorboard.

26. The reconfigurable floorboard system of claim 9, wherein the upper surface of the member of the floor grid structure is flat between a first side edge and a second side edge of the member.

27. The reconfigurable floorboard system of claim 26, wherein the member of the floor grid structure is disposed on a floor beam.

* * * * *